(12) United States Patent
LeBeau et al.

(10) Patent No.: US 12,665,156 B2
(45) Date of Patent: Jun. 23, 2026

(54) NIGHTVISION TUBE MODULE SIMPLIFICATION

(71) Applicant: L3Harris Technologies, Inc., Melbourne, FL (US)

(72) Inventors: Edward S. LeBeau, Mesa, AZ (US); Alexei Sheydayi, Gilbert, AZ (US); Keith Tognoni, Tempe, AZ (US); Jon D. Burnsed, Tempe, AZ (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 188 days.

(21) Appl. No.: 18/674,035

(22) Filed: May 24, 2024

(65) Prior Publication Data

US 2025/0364203 A1    Nov. 27, 2025

(51) Int. Cl.
| | |
|---|---|
| *H01J 31/50* | (2006.01) |
| *G02B 23/12* | (2006.01) |
| *H01J 29/98* | (2006.01) |

(52) U.S. Cl.
CPC ............ *H01J 29/98* (2013.01); *G02B 23/125* (2013.01); *H01J 31/507* (2013.01)

(58) Field of Classification Search
CPC ........ G01B 23/125; H01J 29/98; H01J 31/507
See application file for complete search history.

(56) References Cited

U.S. PATENT DOCUMENTS

| | | | |
|---|---|---|---|
| 6,288,386 B1 | 9/2001 | Bowen et al. | |
| 7,072,107 B2 | 7/2006 | Filipovich et al. | |
| 8,269,159 B2 | 9/2012 | Filipovich et al. | |
| 11,054,629 B1 | 7/2021 | Sheydayi et al. | |
| 2010/0128135 A1 | 5/2010 | Filipovich et al. | |
| 2014/0286039 A1* | 9/2014 | Sigler ..................... F21V 33/00 | |
| | | | 362/555 |
| 2023/0266578 A1 | 8/2023 | Sheydayi | |

FOREIGN PATENT DOCUMENTS

| | | |
|---|---|---|
| NL | 2012367 B1 | 1/2016 |

OTHER PUBLICATIONS

Extended European Search Report dated Sep. 15, 2025 issued in European Patent Application No. 25163513.2, 9 pp.
Wikipedia the Free Encyclopedia, "Electroluminescent Display," Retrieved from the Internet: URL:https://en.wikipedia.org/w/index. php?, title=Electroluminescent_display&oldid=1214480297, Mar. 14, 2024, 2 pp.

* cited by examiner

*Primary Examiner* — Mark R Gaworecki
(74) *Attorney, Agent, or Firm* — NIXON & VANDERHYE P.C.

(57) ABSTRACT

An image intensifier assembly has an image intensifier tube having a optical element. The optical element includes a emitting surface. The optical element comprises an outer dimension. The image intensifier assembly further includes a first power supply comprising a first circuit board having a first inner dimension defining an opening, a first outer dimension and a first thickness. The first inner dimension surrounds the outer dimension of the optical element. The first outer dimension is within the image intensifier assembly. The first circuit board further includes a component surface. The component surface extends from the first inner dimension to the first outer dimension. The first circuit board has power supply components mounted on the component surface.

30 Claims, 8 Drawing Sheets

_304_

_300_

Nightvision System 100

Objective 102

Housing 124

Eyepiece 122

NIGHTVISION TUBE MODULE SIMPLIFICATION

BACKGROUND

Background and Relevant Art

Nightvision systems allow a user to see in low-light environments without external human visible illumination. This allows for covert vision in a low-light environment to prevent flooding the environment with human visible light and/or protects the user from being detected due to causing human visible light or light that is otherwise detectable to other nightvision systems to be emitted.

Some nightvision systems function by receiving low levels of light reflected off of, or emitted from objects and providing that light to an image intensifier (sometimes referred to as $I^2$). The image intensifier has a photocathode. When photons strike the photocathode, electrons are emitted into a vacuum tube, and directed towards a microchannel plate to amplify the electrons. The amplified electrons strike a phosphor screen. The phosphor screen is typically chosen such that it emits human visible light when the amplified electrons strike the phosphor screen. The phosphor screen light emission is coupled, typically through an inverting fiber-optic element, to an eyepiece where the user can directly view the illuminated phosphor screen, thus allowing the user to see the objects.

Currently, nightvision systems are implemented by packaging the image intensifier into an image intensifier assembly and deploying the image intensifier assembly into a housing of a nightvision system. The nightvision system typically includes an objective which receives weak light and provides it to the image intensifier in the image intensifier assembly. The image intensifier amplifies the weak light and outputs intensified light to an eyepiece where the intensified light is provided to a user.

Several challenges exist in current nightvision systems. One such challenge relates to image intensifier and images intensifier assembly configurations. In particular, different manufacturers of the same form factor nightvision system will typically implement customized and nonstandard interfaces to the image intensifier assembly. For example, a binocular system is a common form factor for nightvision systems. Several different manufacturers manufacture nightvision systems in this form factor. However, different manufacturers have different pin and interface configurations on image intensifier assemblies such that the different image intensifier assemblies or optical components cannot always be exchanged between different nightvision systems of the same form factor, but from different manufacturers. Nonetheless, nightvision system customers are demanding commercial off-the-shelf solutions and modular open systems architecture to obtain: simplicity in integration, easily upgradable systems, off-the-shelf components, and standardized protocols.

Another challenge that currently exists relates to the ability to upgrade existing systems with new functionality. For example, current image intensifier assemblies are of a particular size such that they occupy nearly the entirety of the space allocated for them in the housing of the nightvision system. Thus, there is insufficient space to add bolt-on components coaxially with the image intensifier assembly to provide additional functionality without deleterious trade-offs. For example, one such trade-off involves reducing the amount of space available for focusing functions of the eyepiece. Alternatively, a trade-off may include less securely closing the housing by using fewer mechanical connection threads of a screw on assembly.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes an image intensifier assembly having an image intensifier tube having a optical element. The optical element includes a emitting surface. The optical element comprises an outer dimension. The image intensifier assembly further includes a first power supply comprising a first circuit board having a first inner dimension defining an opening, a first outer dimension and a first thickness. The first inner dimension surrounds the outer dimension of the optical. The first outer dimension is within the image intensifier assembly. The first circuit board further includes a component surface. The component surface extends from the first inner dimension to the first outer dimension. The first circuit board has power supply components mounted on the component surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein implement certain optimizations that can be used to reduce image intensifier assembly size. In particular, embodiments implement a new and novel power supply configuration which allows for reduced size of the image intensifier assembly so as to allow for certain upgrades coaxial with the image intensifier to be implemented within a nightvision system. In particular, the new power supply includes a substantially reduced electronics footprint as compared to previous power supplies. This reduced footprint allows the power supply to be implemented with toroid or ring shaped circuit boards having a component surface orientation (e.g. vector normal to the component surface) that is parallel to the optical axis of the image intensifier as opposed to previously implemented circuit boards which had a component surface that faced the optical axis of the image intensifier. This allows for a shorter image intensifier assembly to be implemented than has been previously implemented. Additional details are now illustrated.

Recent advances in nightvision technology have allowed for simultaneous display of digital information overlaid on direct-view (i.e., in-line with the optical axis of the image intensifier) image intensifier images. In particular, a transparent and/or semi-transparent digital electro-optical device can be placed at the output of the image intensifier, and more particularly, at a fiber-optic inverter output, such that light from the image intensifier passes through the electro-optical device, while the electro-optical device simultaneously displays digital information to a user. These electro-optical devices may alternatively or additionally include detector circuits, e.g., to implement camera functionality, to detect light from the image intensifier, or other sources.

A transparent display and detector electro-optical device, when used in conjunction with an image intensifier tube, relies on transmission of the image intensifier image through the electro-optical device to allow for simultaneous overlay of digital information and viewing of the nightvision scene. However, adding one of these electro-optical devices coaxially with the image intensifier assembly, uses space in the nightvision system housing originally reserved for the image intensifier assembly. However, by using the power supply configuration illustrated herein, the image intensifier assembly size can be reduced to allow for overlaying electro-optical devices coaxially with an image intensifier assembly. Note that as used herein, coaxial with the image intensifier assembly means along the longitudinal axis. This longitudinal axis may also be the optical axis, or at least parallel to the optical axis.

Figure 1:
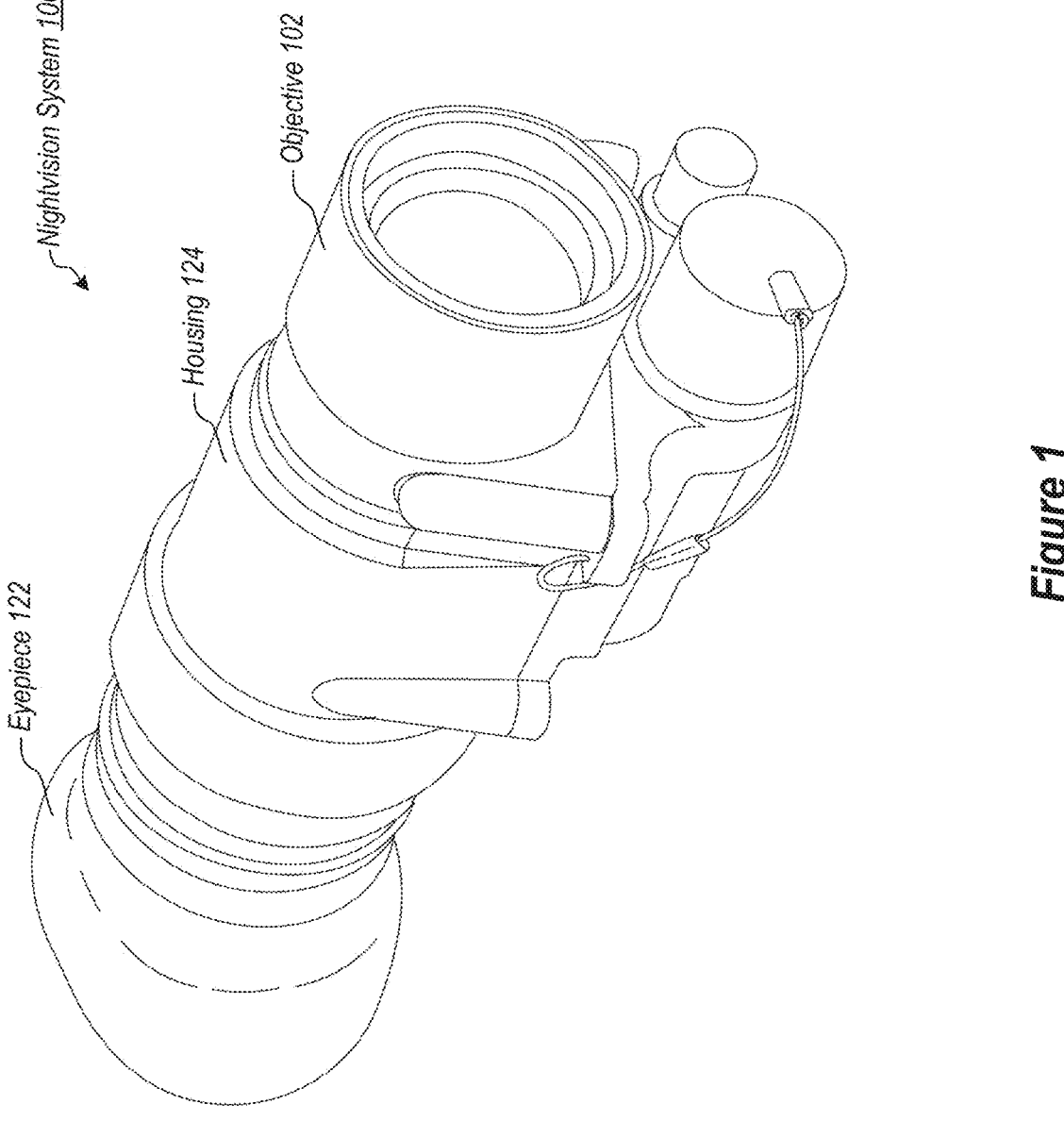
FIG. 1 illustrates a nightvision system.

Attention is now directed to FIG. 1, where a specific example of a nightvision system is illustrated. In particular, FIG. 1 illustrates a monocular form factor nightvision system 100. In the example illustrated, the nightvision system 100 includes a housing 124. The housing 124 houses various components, including an image intensifier assembly and an electro-optical device. The nightvision system 100 further includes an objective 102 which receives weak light reflected and/or generated in an environment. The objective 102 includes optics such as lenses, waveguides, and/or other optical components for receiving and transmitting light to an image intensifier assembly in the housing 124, discussed in more detail below. The nightvision system 100 further includes an eyepiece 122. The eyepiece 122 includes optics for focusing images created by the nightvision system 100, including images created by an image intensifier and images created by a digital display of the electro-optical device, into the eye of the user.

Figure 2:
FIG. 2 illustrates a nightvision scene image with heads-up display functionality.

As discussed above, and with reference to FIG. 2, modern ancillary functionality can be added to existing nightvision systems. FIG. 2 illustrates an image 200 including a heads-up display displayed on a nightvision image output from an image intensifier. Some embodiments described herein are directed to implementing a heads-up display implemented by adding image overlay capabilities with a nightvision system.

The heads-up display may display to the user, in or around the field-of-view of an environment, various pieces of information to create an augmented reality (AR) environment. Such information may include, for example, a navigational heading, the speed at which the user is moving, coordinates, communication messages (such as email, SMS, etc.), time of day or other timing information, vital signs for the user such as heart rate or respiration rate, indicators indicating whether an object being viewed by the nightvision system is friendly or adversarial, battery charge level for the nightvision system or other devices, weather conditions, contact information, audio or video information (such as, name of source, playback details, etc.), and so on.

Figure 3:
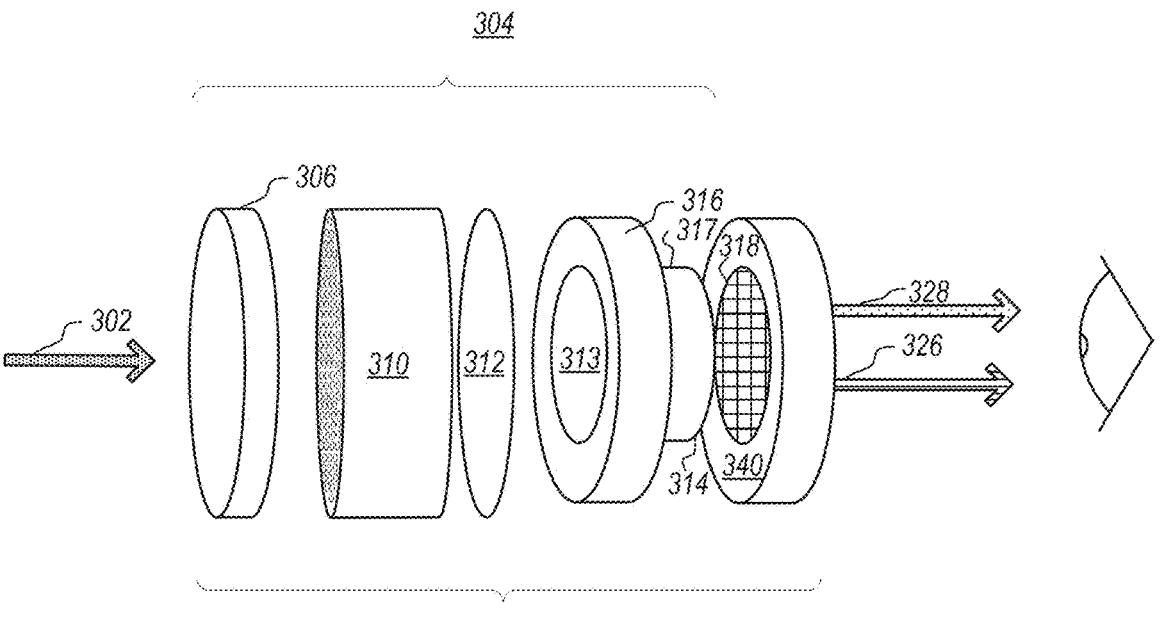
FIG. 3 illustrates an exploded block diagram of components of a nightvision system.

Attention is now directed to FIG. 3. FIG. 3 illustrates a block diagram version of a nightvision system 300. While not shown in FIG. 3, a nightvision system typically includes an objective (such as that shown in FIG. 1 at 102) to focus input light 302 into an image intensifier 304. Such input light may be, for example, from ambient sources, such as light from heavenly bodies such as stars, the moon, or even faint light from the setting sun. Additionally, or alternatively, ambient sources could include light from buildings, automobiles, or other faint sources of light that cause reflection of light from an object being viewed in a nightvision environment into the objective. A second source of light may be light being emitted from an external source towards an object, reflected off the object, and into the objective. For example, the source may be an infrared source that is not detectable in the visual spectrum for human observers. A third source of light may be light emitted by an object itself. For example, this may be related to infrared heat energy emitted by the object and directed into the objective. Nonetheless, the nightvision system is able to convert the light emitted from the source into a viewable image for the user.

Note that the image intensifier 304 may include functionality for amplifying light received from the objective to create a sufficiently strong image that can be viewed by the user. This may be accomplished using various technologies such as a photocathode 306, a microchannel plate 310, and a phosphor screen 312. The photocathode 306 may be configured to generate photo electrons in response to incoming photons. Electrons from the photocathode 306 are emitted into the microchannel plate 310. Electrons are multiplied in the microchannel plate 310. Electrons are emitted from the microchannel plate 310 to a phosphor screen 312 which glows as a result of electrons striking the phosphor screen 312. This creates an image from the input light 302.

A optical element 313 carries this image as intensified light to the eyepiece (such as eyepiece 122 illustrated in FIG. 1) of a nightvision system where it can be output to the user. This optical element 313 can be twisted 180 degrees, thus being a fiber-optic inverter, to undo the inversion caused by the system objective to allow for convenient direct viewing of the phosphor screen 312. However, as illustrated below, the intensified light is output to the user through an electro-optical device 318.

The electro-optical device 318 allows intensified light to pass through the electro-optical device 318, but also generates its own light, from LEDs or other light emitters, to transmit to a user through the objective. Creating an electro-optical device may be accomplished, for example, using the teachings of U.S. patent application Ser. No. 16/868,306, filed on May 6, 2020, titled "Backside Etch Process For Transparent Silicon Oxide Technology", which is incorporated herein by reference, in its entirety. As discussed above, the electro-optical device 318 may include functionality for displaying information to a user. Such information may include graphical content, including text, images, and the like.

Note that other electro-optical devices may be used in various embodiments, including peripheral overlay displays (e.g., a screen offset from the center of the field of view) thin-film electroluminescent (TFEL) displays, or other displays.

In the example illustrated in FIG. 3, the electro-optical device 318 outputs display light 326 which can be sent to the eyepiece (such as the eyepiece 122 illustrated in FIG. 1). As noted previously, the intensified light 328 is also provided to the eyepiece. Thus, an image such as that illustrated in FIG. 2 is presented to the user in the nightvision system.

In the illustrated example, the electro-optical device 318 is composed of a number of active silicon areas. In particular, the electro-optical device 318 may include a digital display having a certain pixel density. Each pixel has one or more transistors controlling one or more OLED emitters. In alternative embodiments illustrated herein, the pixels may include, alternatively or additionally to the display elements, light detectors. This can be useful for detecting the intensified light from the phosphor screen 312. This detected light can be used to characterize the image intensifier image.

In some embodiments, the detected light can additionally be used for recording scene events and/or improving placement of elements displayed on the heads-up display. In any case, the electro-optical device 318 is representative of a stacked device formed in a semiconductor chip that overlaps an underlying device, in this case, the underlying device is an image intensifier 304. The stacked device is transparent to light in a first spectrum, which in this case is the visible spectrum of light output by the phosphor screen 312. That is, the electro-optical device 318 is not fully transparent due to the blocking of the active devices, but transparency referred to herein refers to at least partial transparency according to some transmission efficiency Indeed, the more active devices implemented per pixel, the less transparent the electro-optical device 318 becomes. Note that FIGS. 3 and 4 further illustrate a power supply 340 that is electrically coupled to, and powers the electro-optical device 318, where the power supply 340 at least partially surrounds the electro-optical device 318. Note that in other example, the electro-optical device 318 may be optically offset axially from the power supply 340 such that the power supply 340 does not surround the electro-optical device 318.

The optical element 313 comprises an emitting surface 314. In some embodiments, the emitting surface 314, is planar, meaning that it is flat. In these embodiments, the planar nature of the emitting surface 314 allows the electro-optical device 318 to be coupled in a fashion such that the optical element 313 at the emitting surface 314 and the electro-optical device 318 are coplanar. The optical element 313 and the electro-optical device 318 being coplanar causes the scene detected by the image intensifier to be emitted in substantially the same focal plane as the light output by a display of the electro-optical device 318 such that both are in simultaneous focus to the user's eye. That is, the intensified light 328 will be coplanar with the display light 326. This creates a natural combined image that can be provided to the user that is less jarring than if the intensified light 328 and the display light 326 are not coplanar enough to be in simultaneous co-focus. Note that when the electro-optical device 318 includes detector functionality, the coplanar nature is useful inasmuch as the detector does not have focusing capabilities, and thus, for proper detection of intensified light, it is helpful if the detector is coplanar with the planar end of the optical element 313.

Note that generally embodiments are implemented so that the electro-optical device 318 is optically coupled in co-focus to, and adjacent to the emitting surface 314 of the optical element 313. Note that as used herein, adjacent means at least one of abutting or close to, where in some embodiments, close to means 5 μm or less.

Various coupling techniques may be used to ensure that the emitting surface 314 of the optical element 313 is in co-focus to the electro-optical device 318. For example, an optically transparent cured adhesive (such as epoxy; a thin, flexible, bonding agent such as acrylic; or other material) may be used to optically couple and firmly bond the emitting surface 314 to the electro-optical device 318. Alternatively, an fluid based coupling may be used to couple but lightly bond, only with surface tension, the emitting surface 314 to the electro-optical device 318. Such fluid based coupling may include oil or other materials that remain at least partially fluid during use of the systems illustrated herein. Generally, any bonding mechanism that fills gap between the transparent electro-optical device 318 and the emitting surface 314 of the optical element 313 may be used provided the residual bond line gap or spacing between them is sufficiently small to maintain acceptable co-focus (e.g. coplanarity).

FIG. 3 further illustrates a simplified representation of a power supply 316 that may be implemented in some embodiments. In some embodiments, the power supply 316 is electrically coupled to, and powers the image intensifier and supplies voltages ranging from between about 600 Volts to 6500 Volts. As illustrated in FIG. 3, the power supply 316 has an outer dimension and an inner dimension defining an opening 336 (see FIG. 5) in the power supply 316. The power supply 316 surrounds an outer dimension 317 of the optical element 313 by the optical element 313 being disposed in the opening. The power supply 316 is implemented such that the power supply 316 is thinner than the optical element 313 is long. In one embodiment, the power supply 316 is about 0.33 inches thick. This allows the optical element 313 to be coupled in a coplanar fashion to the electro-optical device 318 when the electro-optical device 318 is used as a backplate for an image intensifier assembly 320 (see e.g., FIG. 4). It should be noted at this point that while the embodiments illustrated herein show the electro-optical device 318 being used as a backplate, in other embodiments, different backplates may be used. Indeed, in some embodiments, the electro-optical device 318 and an additional backplate may be used. The power supply 316 is implemented such that a component surface 323 (see FIG. 4) of the power supply 316, upon which electronic components are mounted is oriented either towards or away from the emitting surface 314 of the optical element 313.

Previous power supplies implemented in image intensifier tubes used a flexible circuit board. In particular, some previous embodiments use a board in a rectangular configuration, that is rolled or curved around the image intensifier tube, resulting in a power supply that occupies 0.45 inches or more thickness around the fiberoptic inverter. In these previous examples, the component surface of the power supply, upon which electronic components are mounted, is pointed towards or away from the longitudinal axis of the optical element.

Figure 4:
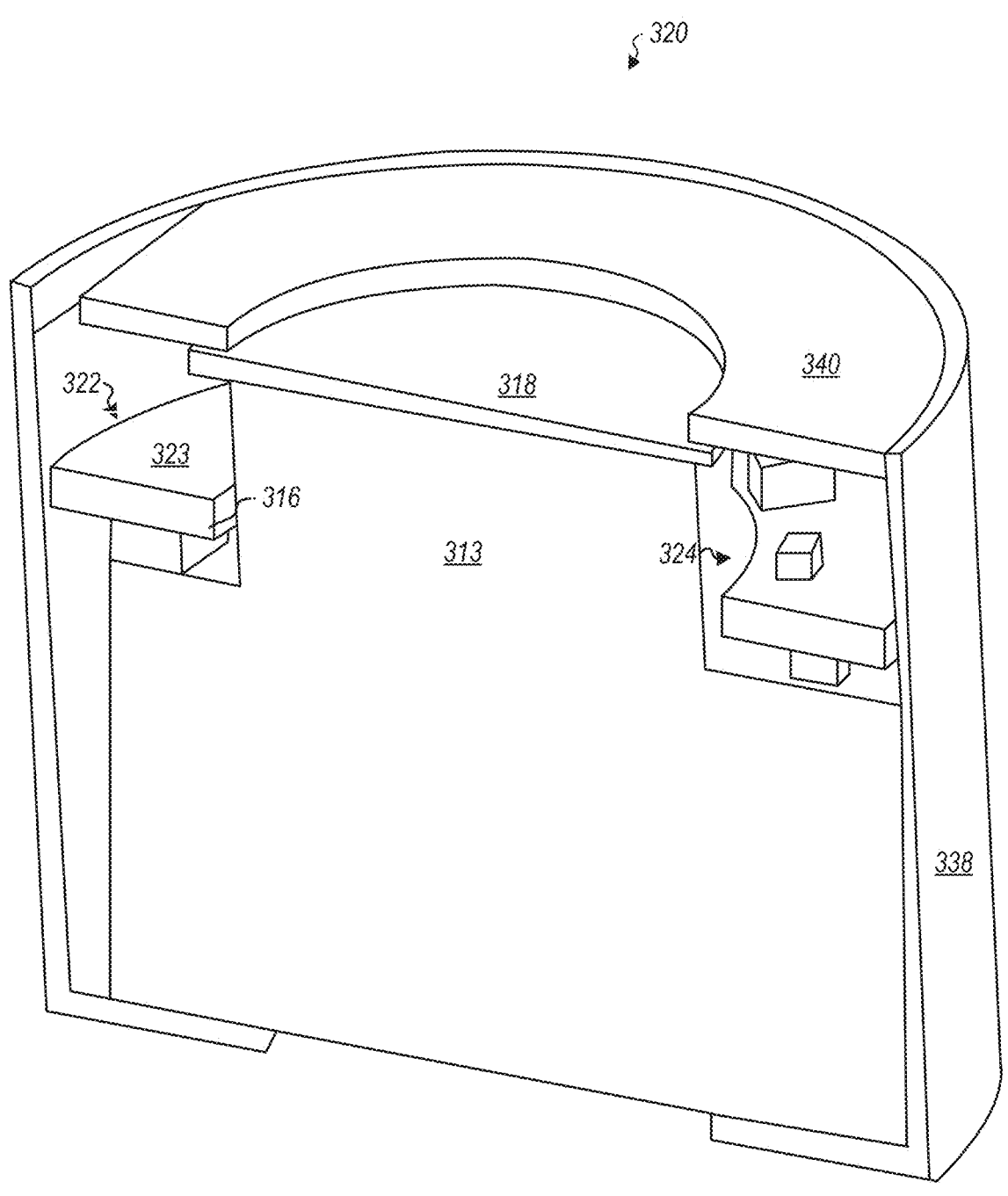
FIG. 4 illustrates a cutaway view of an image intensifier assembly.

Referring now to FIG. 4, additional details are illustrated with respect to the power supply 316. FIG. 4 illustrates a cutaway view of an image intensifier assembly 320. The power supply 316, in some embodiments is implemented using a circuit board 322. The circuit board 322 has a component surface 323 which extends from the inner dimension to the outer dimension of the circuit board. Power supply components 324 are mounted on the component surface 323 of the circuit board. In the example illustrated, a rigid (e.g. FR-4 or similar) standard circuit board material is used to implement the circuit board 322 as opposed to previously used flex circuit boards. In the example illustrated, various components are used to construct the power supply. In particular, smaller surface mount (e.g. 0603 form factor) 1 KV capacitors can be used to facilitate a smaller footprint on the circuit board 322 to allow for the new circuit board design. Further, modern multiplier diodes having a reduced footprint as compared to previously used multiplier diodes in flex circuit implementations are used to further reduce footprint on the circuit board 322. Further still, an miniaturized transformer core/bobbin is used to implement the power supply 316. Using commercially available EP5 magnetic elements, a resonant transformer can be implemented that meets both voltage and efficiency requirements within the limited size constraints of the circuit board 322.

In some embodiments, the power supply is thusly implemented such that it may have a fixed duty cycle as opposed to other designs which use autogating. In particular, autogating is a technique used to limit the amount of light that reaches a microchannel plate. In the embodiments illustrated herein, the power supply 316 provides a fixed duty cycle of pulsed limited charge during autogating to the image intensifier 304, thus eliminating the need for feedback controlled autogating. Note that this results in a simplified power supply design including elimination of photocathode sense and control for a smaller circuit, and elimination of a secondary microcontroller or other mechanism to control the autogating duty cycle.

Note that the particular power supply design provides improved voltage standoff due to increased path length. Voltage standoff generally refers to dielectric strength or breakdown voltage between two conductors. The standoff voltage is the voltage above which an insulator or surface separation may become conductive. That insulator may be air or insulative materials. When voltage difference between two points, through an insulator, becomes sufficiently high, the insulator will become conductive and an arc will occur through the insulator from one point to another. One method of increasing the standoff voltage between two points is to add additional separation or using insulating materials having high dielectric strength between the two points. For example, in previous power supply designs, the flexible circuit board was wrapped and then potted to increase the standoff voltage between components. Additional potting was performed once the power supply was installed in the package 338 of the image intensifier assembly. However, using the new power supply design illustrated herein, more distance exists between components meaning that instead of potting, either no coating or just a thin coating, such as a conformal coating, can be used to support the necessary standoff voltage for operating an image intensifier tube.

Using the illustrated power supply 316 shown, embodiments can implement shorter image intensifier assemblies. This allows for additional components to be added coaxially with the image intensifier assemblies inside of the nightvision system housing. For example, various additional displays, beam splitters, beam combiners, cameras and the like can be added in the housing with the image intensifier assembly. Note that this is due to the housing having a particular size configured for a certain size image intensifier assembly, and by reducing the image intensifier assembly size, additional space is freed up for other elements.

Nightvision systems typically include LEDs to provide indicators to system users. In particular, the LEDs provide an indication to the user that battery power is low in the nightvision system. Alternatively, or additionally, LEDs can provide indicators to users to indicate that an infrared illumination source is being used to provide additional lighting for the nightvision system. These can be important safety considerations given that battery depletion may prevent the nightvision system from being used when needed. Using additional infrared illumination can cause a user to be seen by other nightvision systems.

Previously, the LEDs were located in a position such that various light pipes were needed to route light around various components in the image intensifier assembly to bring light emitted from the LEDs into the user's field of view.

Figure 5:
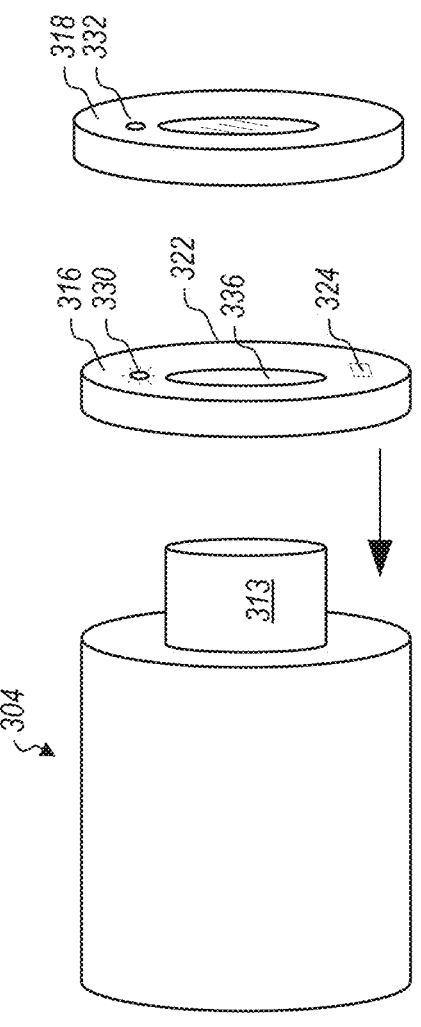
FIG. 5 illustrates a simplified and exploded view of an image intensifier assembly.
Figure 5:
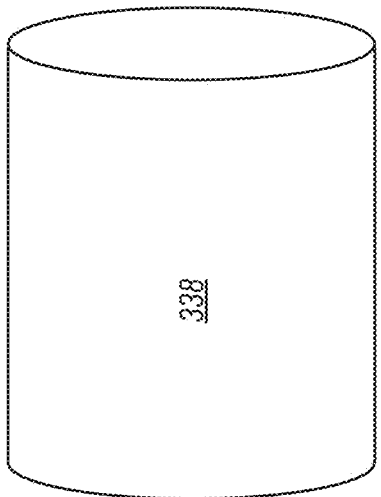

Embodiments illustrated herein can include LEDs on the power supply circuit board 322 in a fashion such that the LEDs can be seen by a user of the nightvision system 300. FIG. 5 illustrates an example. FIG. 5 illustrates an LED 330 mounted to the circuit board 322 of the power supply 316. The electro-optical device 318 includes an opening 332 which allows light from the LED 330 to be transmitted to a user. The LED is driven by an internal power supply when signaled to illuminate by digital communication from the nightvision system control circuitry. Four alternative LED arrangements are considered here including: 1) the LED 330 is tall and sticks up through the opening 332 (see also FIG. 6); 2) the LED 330 is short and a lightpipe is used to get light out through the opening 332 (see also FIG. 6); 3) the LED 330 is short and clear potting is used to get light through the opening 332 (see also FIG. 6); or 4) the LED 330 is short so clear potting is used to get the light out diffusely around the optical element 313 due to clearance 334 to the electro-optical device 318 (see FIG. 7).

By including the LED 330 on the circuit board 322 of the power supply 316, the LED is more accessible to the user without the need for more complex lightpipe routing arrangements that add cost and complexity.

Figure 6:
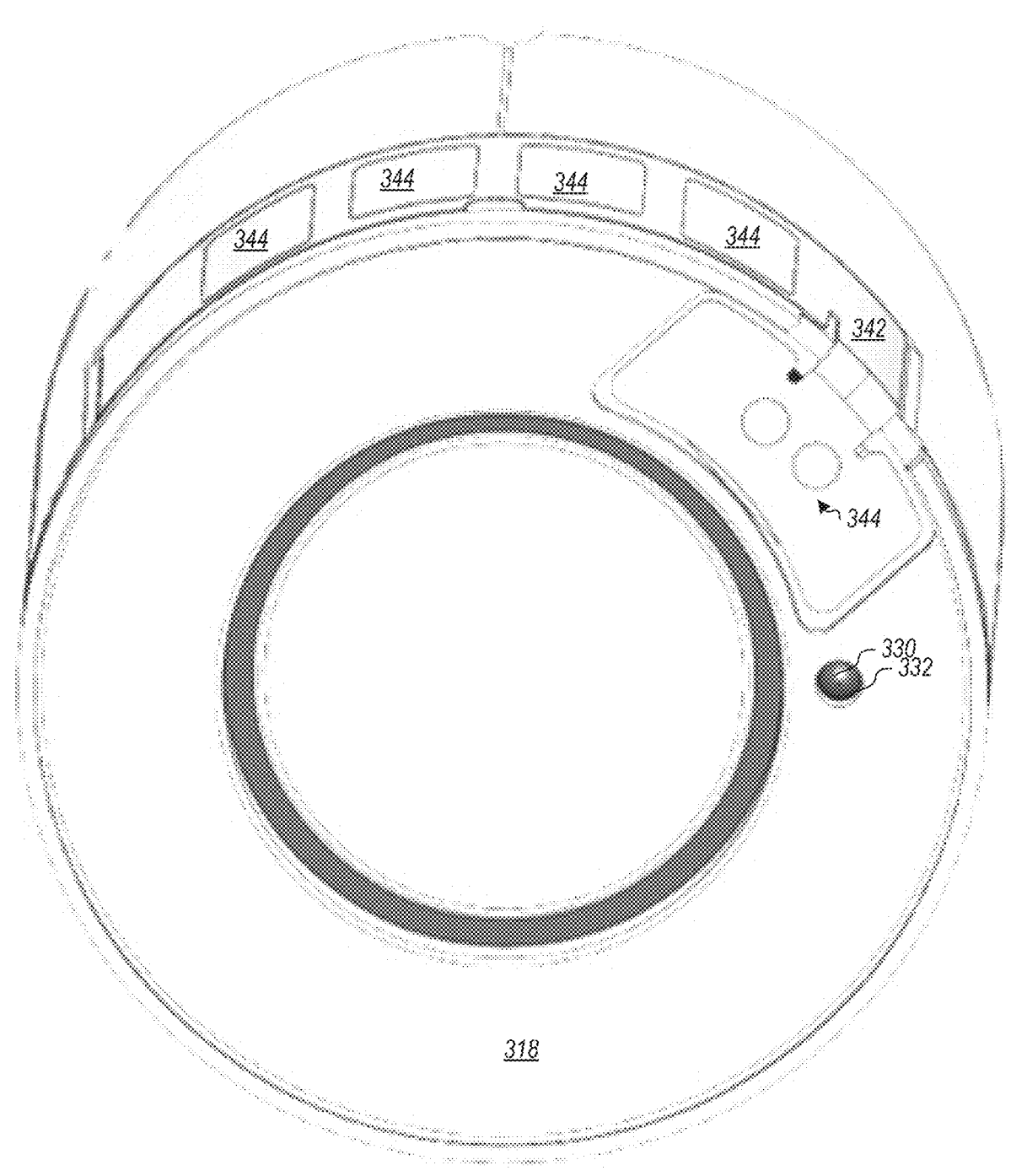
FIG. 6 illustrates a top view of an image intensifier assembly including an LED and an opening for the LED.
Figure 7:
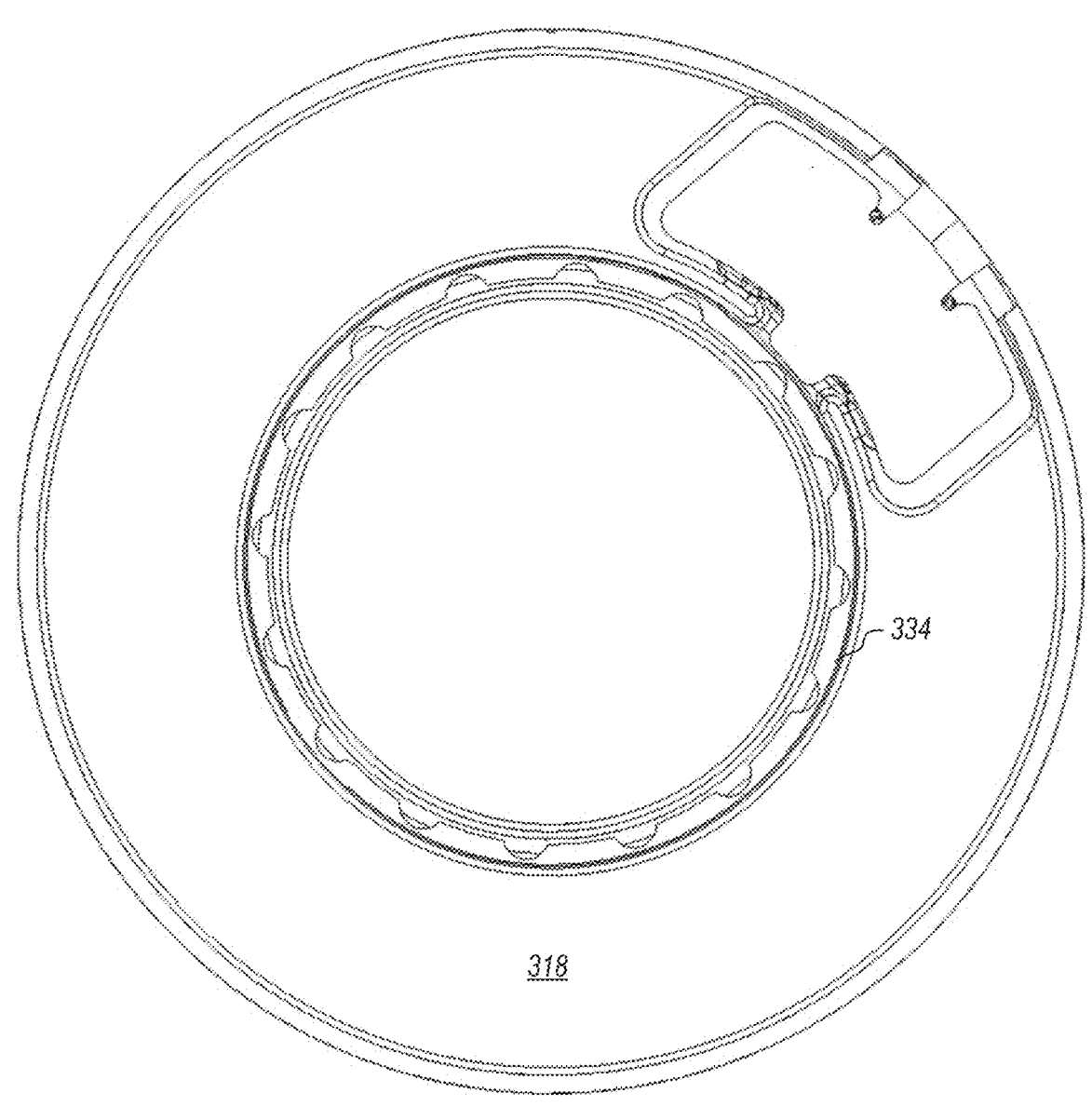
FIG. 7 illustrates a top view of an image intensifier assembly including a clearance which allows for light from the LED to be transmitted to a user.
Figure 8:
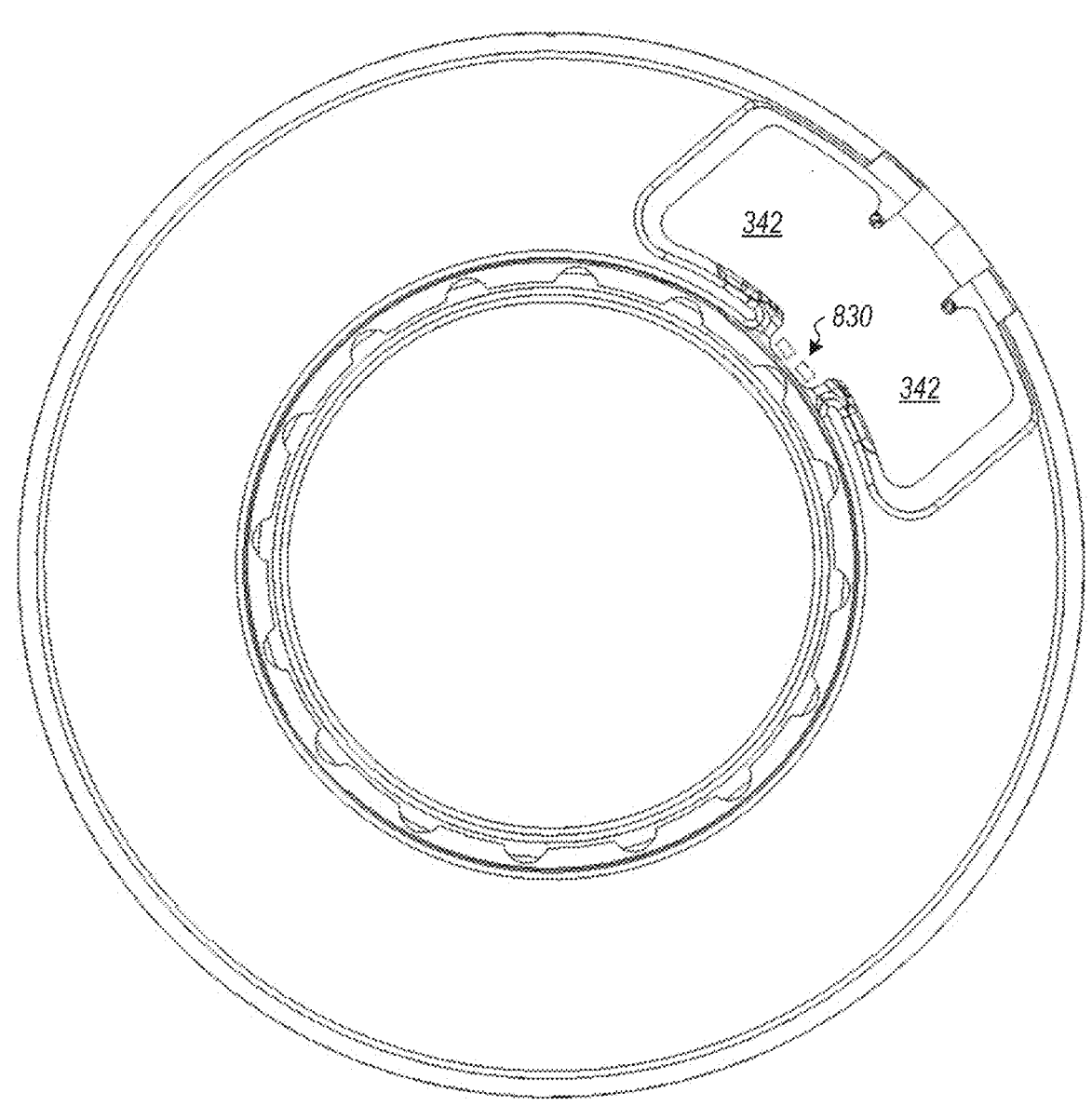
FIG. 8 illustrates a top view of an image intensifier assembly including a LEDs disposed on a flexible circuit board in a user's field of view.
Figure 9:
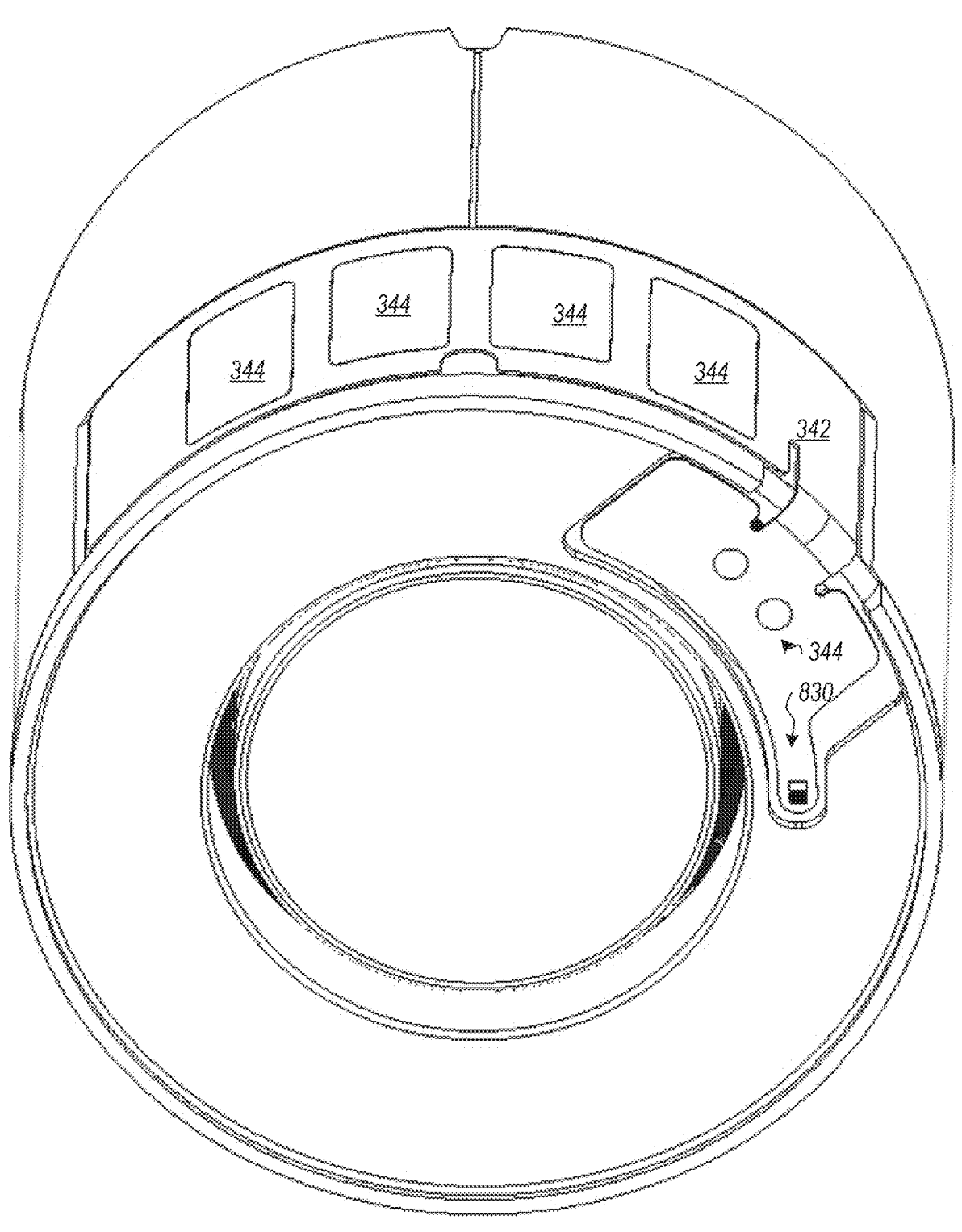
FIG. 9 illustrates a top view of an image intensifier assembly including a LEDs disposed on a flexible circuit board in a user's field of view.

In alternative embodiments, as illustrated in FIGS. 8 and 9, LEDs 830 or 930 respectively are mounted to an external flexible circuit board 342 (see also FIG. 6). The flexible circuit board 342 may include an adhesive that allows the flexible circuit board 342 to act as a "sticker" that can be attached to the package 338 (see FIG. 5) and folded on to the backplate. The LEDs are positioned on the flexible circuit board such that the LEDs are visible within a user's field of view when integrated into a nightvision system 100. The LEDs 830 or 930 can be powered by an internal power supply internal to the image intensifier assembly such as the power supply 316. In some embodiments, digital signals can be provided to the power supply 316 to indicate that the LEDs should be turned on or off. Such signals may come from other control systems within a nightvision system. On receipt of such signals, the power supply 316 can provide or remove power from the LEDs 830 or 930.

Alternatively, the LEDs 830 or 930 may be controlled by contacts, such as free pads from among the pads 344 by external control signals. That is, the LEDs 830 or 930 may be coupled to pads that are not otherwise connected to the power supply 316. Thus, for example a power voltage could be applied directly to the pads to illuminate the LEDs 830 or 930.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An image intensifier assembly having:
an image intensifier tube having an optical element, the optical element having an emitting surface the optical element having an outer dimension;
a first power supply comprising a first circuit board having a first inner dimension defining an opening, a first outer dimension and a first thickness, the first inner dimension surrounding the outer dimension of the optical element, the first outer dimension within the image intensifier assembly, the first circuit board further having a component surface, the component surface extending from the first inner dimension to the first outer dimension, the first circuit board having power supply components mounted on the component surface,
wherein the first power supply is electrically coupled to the image intensifier tube to operate the image intensifier tube.

2. The image intensifier assembly of claim 1 further comprising a transparent electro-optical device, optically coupled in co-focus to, and adjacent to the emitting surface of the optical element.

3. The image intensifier assembly of claim 2, a second power supply electrically coupled to the transparent electro-optical device to operate the transparent electro-optical device, the second power supply at least partially surrounding the transparent electro-optical device.

4. The image intensifier assembly of claim 2, a second power supply electrically coupled to the transparent electro-optical device to operate the transparent electro-optical device, the transparent electro-optical device being optically offset axially from the second power supply.

5. The image intensifier assembly of claim 2, wherein the first power supply is electrically coupled to the transparent electro-optical device to operate the transparent electro-optical device.

6. The image intensifier assembly of claim 2, wherein the transparent electro-optical device is optically coupled to the emitting surface of the optical element using an adhesive.

7. The image intensifier assembly of claim 2, wherein the transparent electro-optical device is optically coupled to the emitting surface of the optical element using an fluid based coupling.

8. The image intensifier assembly of claim 2, wherein the transparent electro-optical device is optically coupled to the emitting surface of the optical element using a bonding method that fills gaps between the transparent electro-optical device and the emitting surface of the optical element.

9. The image intensifier assembly of claim 2, wherein the transparent electro-optical device comprises one or more OLED emitters.

10. The image intensifier assembly of claim 2, wherein the transparent electro-optical device comprises a thin-film electroluminescent (TFEL) display.

11. The image intensifier assembly of claim 2, wherein the transparent electro-optical device comprises camera functionality.

12. The image intensifier assembly of claim 1, further having an LED mounted on the first power supply.

13. The image intensifier assembly of claim 12, further comprising a backplate proximate to the emitting surface, the LED extending through an opening in the backplate.

14. The image intensifier assembly of claim 12, further comprising:
a backplate proximate to the emitting surface; and
a lightpipe coupled to the LED, the lightpipe extending through an opening in the backplate.

15. The image intensifier assembly of claim 12, further comprising:
a backplate proximate to the emitting surface; and
clear potting coupled to the LED configured to cause light from the LED to pass through an opening in the backplate.

16. The image intensifier assembly of claim 12, further comprising:
a backplate proximate to the emitting surface; and
clear potting coupled to the LED configured to cause light from the LED to pass through clearance between optical element and the backplate.

17. The image intensifier assembly of claim 1, wherein the optical element is a fiber-optic inverter.

18. The image intensifier assembly of claim 1, further comprising:
a backplate proximate to the emitting surface; and
a flexible circuit board having a first portion coupled to the backplate, the flexible circuit board having one or more LEDs mounted to the flexible circuit board, the LEDs positioned on the flexible circuit board such that the LEDs are visible within a user's field of view when the image intensifier assembly is installed in a nightvision system.

19. The image intensifier assembly of claim 18, further comprising an outer package surrounding the image intensifier tube and the first power supply, and wherein the flexible circuit board has a second portion that wraps around the outer package, the first portion being bent from the second portion onto the backplate.

20. The image intensifier assembly of claim 18 wherein the flexible circuit board comprises one or more pads coupled to the first power supply and one or more additional pads coupled to the LEDs to control the LEDs.

21. The image intensifier assembly of claim 18 wherein the flexible circuit board comprises one or more pads coupled to the first power supply, wherein signals to the one or more pads can be provided to control the LEDs.

22. The image intensifier assembly of claim 18 wherein the backplate comprises a transparent electro-optical device.

23. A nightvision system having:
an image intensifier tube having an optical element, the optical element having an emitting surface the optical element having an outer dimension;

a first power supply being coupled to the image intensifier tube;

a backplate proximate to the emitting surface; and a flexible circuit board having a first portion coupled to the backplate, the flexible circuit board having one or more LEDs mounted to the flexible circuit board, the LEDs positioned on the flexible circuit board such that the LEDs are visible within a user's field of view, wherein the flexible circuit board comprises one or more pads coupled to the first power supply, wherein signals to the one or more pads can be provided to control the LEDs.

24. The nightvision system of claim 23, further comprising an outer package surrounding the image intensifier tube and the first power supply, and wherein the flexible circuit board has a second portion that wraps around the outer package, the first portion being bent from the second portion onto the backplate.

25. The nightvision system of claim 23 wherein the flexible circuit board comprises one or more additional pads coupled to the LEDs to control the LEDs.

26. The nightvision system of claim 23 wherein the provided signals are digital signals.

27. The nightvision system of claim 23 wherein the backplate comprises a transparent electro-optical device.

28. A method of assembling an image intensifier assembly, the method comprising:

placing an image intensifier tube in a package, the image intensifier tube having a optical element, the optical element having an emitting surface, the optical element having an outer dimension;

disposing a first power supply around the optical element outer dimension, the power supply comprising a first circuit board having a first inner dimension defining an opening, a first outer dimension and a first thickness, the first inner dimension surrounding the outer dimension of the optical element, the first outer dimension within the package, the first circuit board further having a component surfaces, the component surface extending from the first inner dimension to the first outer dimension, the first circuit board having power supply components mounted on the component surfaces, wherein the first power supply is electrically coupled to the image intensifier tube to operate the image intensifier tube.

29. The method of claim 28, further comprising coupling an electro-optical device to the emitting surface using a bonding method that fills gaps between the electro-optical device and the emitting surface.

30. The method of claim 28, wherein the first power supply comprises an LED mounted on the component surface, the method further comprising potting the intensifier assembly with clear potting to configure the intensifier assembly to output light from the LED to a user.

* * * * *